(12) United States Patent
Amino

(10) Patent No.: US 7,567,814 B2
(45) Date of Patent: Jul. 28, 2009

(54) TIME SYNCHRONIZED RADIO TRANSMISSION SYSTEM

(75) Inventor: Tadashi Amino, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 965 days.

(21) Appl. No.: 10/849,381

(22) Filed: May 20, 2004

(65) Prior Publication Data

US 2004/0235507 A1    Nov. 25, 2004

(30) Foreign Application Priority Data

May 23, 2003    (JP)    ............................. 2003-145980

(51) Int. Cl.
*H04B 7/24*    (2006.01)
*H04J 3/06*    (2006.01)

(52) U.S. Cl. .................. 455/502; 455/517; 455/180.3; 455/260; 370/324; 370/350; 375/365

(58) Field of Classification Search .............. 455/502, 455/517, 180.3; 370/350, 516
See application file for complete search history.

(56) References Cited

U.S. PATENT DOCUMENTS

| | | | |
|---|---|---|---|
| 5,526,362 A * | 6/1996 | Thompson et al. | 370/516 |
| 6,661,811 B1 * | 12/2003 | Baker | 370/516 |
| 2002/0075867 A1 | 6/2002 | Hermann | |
| 2003/0035420 A1 | 2/2003 | Niu | |
| 2003/0092460 A1 * | 5/2003 | Hayashi | 455/517 X |

FOREIGN PATENT DOCUMENTS

| | | |
|---|---|---|
| CN | 1339749 A | 3/2002 |
| CN | 1349326 A | 5/2002 |
| JP | 02-296434 A | 12/1990 |
| JP | 8-125871 | 5/1996 |
| JP | 2000-332802 A | 11/2000 |
| JP | 2002-374525 | 12/2002 |
| WO | WO 02/093938 A1 | 11/2002 |

OTHER PUBLICATIONS

Office Action dated Mar. 29, 2006 issued in corresponding Japanese Patent Application No. 2003-145980.
Office Action dated Mar. 31, 2006 issued in corresponding Chinese Application No. 2004 1047703.6.
Front page of patent publication of Chinese Application No. 2004 1047703.6.

* cited by examiner

*Primary Examiner*—Philip J Sobutka
(74) *Attorney, Agent, or Firm*—Westerman, Hattori, Daniels & Adrian, LLP.

(57) ABSTRACT

In a radio transmission system, a receiver comprises means for synchronizing the time on the side of the receiver with the time on the side of the transmitter by a PLL circuit on the basis of receiving intervals of a packet transmitted for each predetermined time interval from a transmitter, means for holding the received packet in a receiving buffer, and means for outputting, when the time on the side of the receiver coincides with the time on the side of the transmitter which is represented by the transmitter-side time information added to the packet held in the receiving buffer, the packet to a decoding device.

4 Claims, 3 Drawing Sheets

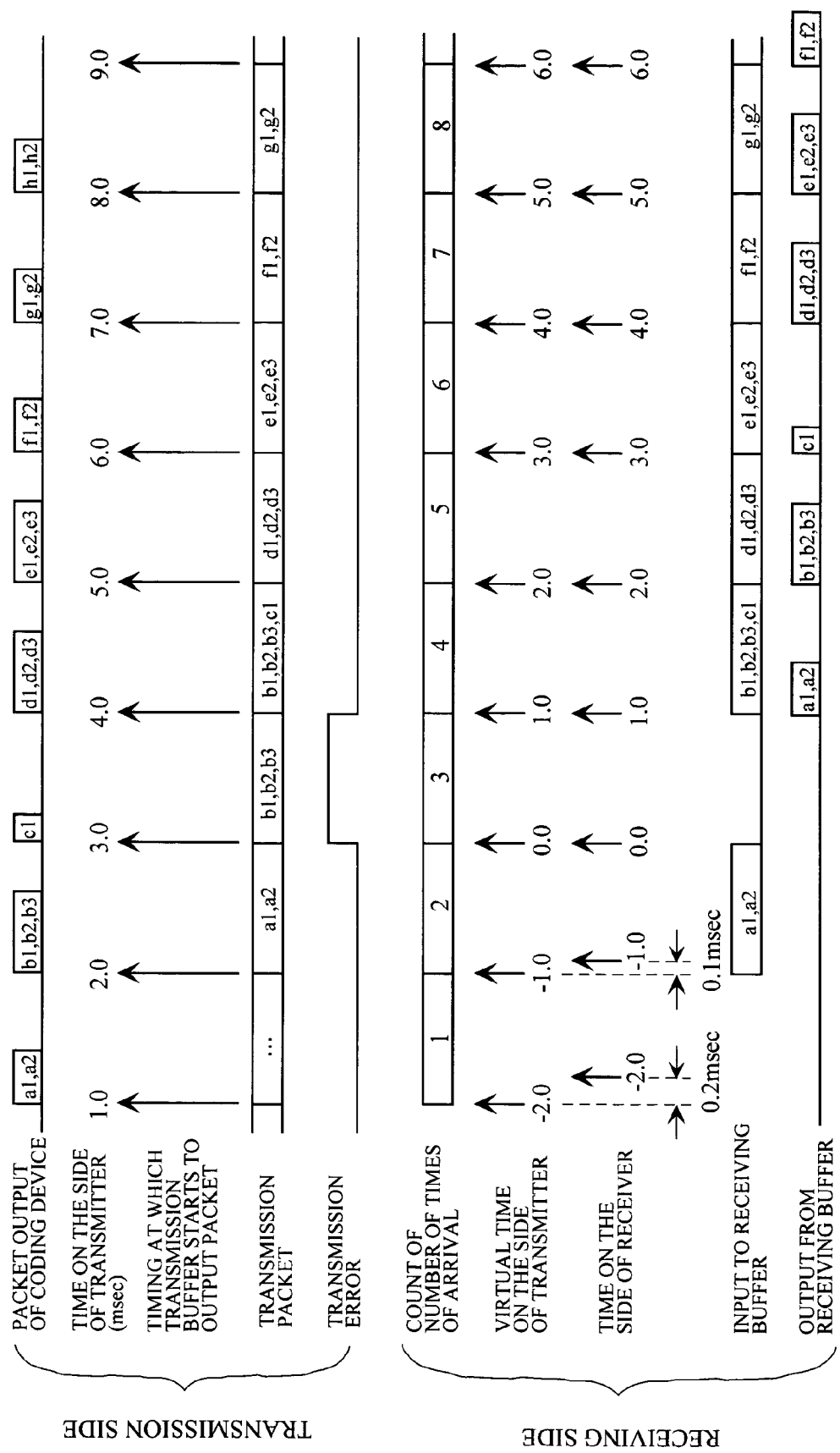

TIME SYNCHRONIZED RADIO TRANSMISSION SYSTEM

BACKGROUND OF THE INVENTION

1. Field of the Invention

The present invention relates to a radio transmission system.

2. Description of the Background Art

In a radio transmission system for a digital video signal, a transmitter stores in a buffer a packet generated by a coding device, and outputs data representing the packet stored in the buffer for each predetermined time period, and a receiver receives a packet to be received, and then immediately outputs the received packet to a decoding device. In the radio transmission system, it has been known that a packet output interval in the coding device and a packet input interval in the receiver differ. Such a phenomenon is referred to as jitter.

Furthermore, in a radio communication transmission path, a transmission error may occur. In a case where an error occurs in the received packet, the receiver issues a retransmission request to the transmitter, and the transmitter which has received the retransmission request retransmits the same packet. If such retransmission is made, the jitter is further increased.

In an MPEG (Moving Picture Experts Group) 2 system frequently utilized in transmission of a digital video/audio signal, when jitter produced by the transmission is increased, overflow or underflow occurs in a buffer in the decoding device, so that video/audio cannot be normally reproduced.

SUMMARY OF THE INVENTION

An object of the present invention is to provide a radio transmission system in which a packet generated by a coding device in a transmitter can be inputted to a decoding device in a receiver in the same time intervals as time intervals of the packet, and good reproduction can be performed without causing overflow or underflow in the decoding device in the receiver.

In a radio transmission system comprising a transmitter comprising a coding device and a receiver comprising a decoding device, the transmitter transmitting a packet outputted from the coding device by radio through a transmission buffer, the receiver notifying, when it has normally received the packet, the transmitter that it has normally received the packet, and the transmitter which has been notified that the receiver has normally received the packet removing only the packet from the transmission buffer, a first radio transmission system according to the present invention is characterized in that the transmitter comprises means for adding to the packet outputted from the coding device transmitter-side time information representing the time on the side of the transmitter when the packet is outputted from the coding device, means for storing in the transmission buffer the packet having the transmitter-side time information added thereto, and means for transmitting the packet stored in the transmission buffer at predetermined time intervals, and the receiver comprises means for synchronizing the time on the side of the receiver with the time on the side of the transmitter by a PLL circuit on the basis of receiving intervals of the packet transmitted for each predetermined time interval from the transmitter, means for holding the received packet in a receiving buffer, and means for outputting, when the time on the side of the receiver coincides with the time on the side of the transmitter which is represented by the transmitter-side time information added to the packet held in the receiving buffer, the packet to the decoding device.

In a radio transmission system comprising a transmitter comprising a coding device and a receiver comprising a decoding device, the transmitter transmitting a packet outputted from the coding device by radio through a transmission buffer, the receiver notifying, when it has normally received the packet, the transmitter that it has normally received the packet, and the transmitter which has been notified that the receiver has normally received the packet removing only the packet from the transmission buffer, a second radio transmission system according to the present invention is characterized in that the transmitter comprises a circuit for adding to the packet outputted from the coding device transmitter-side time information representing the time on the side of the transmitter when the packet is outputted from the coding device, a circuit for storing in the transmission buffer the packet having the transmitter-side time information added thereto, and a circuit for transmitting the packet stored in the transmission buffer at predetermined time intervals, and the receiver comprises a circuit for synchronizing the time on the side of the receiver with the time on the side of the transmitter by a PLL circuit on the basis of receiving intervals of the packet transmitted for each predetermined time interval from the transmitter, a circuit for holding the received packet in a receiving buffer, and a circuit for outputting, when the time on the side of the receiver coincides with the time on the side of the transmitter which is represented by the transmitter-side time information added to the packet held in the receiving buffer, the packet to the decoding device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a timing chart showing signals in respective units in each of a transmitter and a receiver.

DESCRIPTION OF THE PREFERRED EMBODIMENTS

Figure 1:
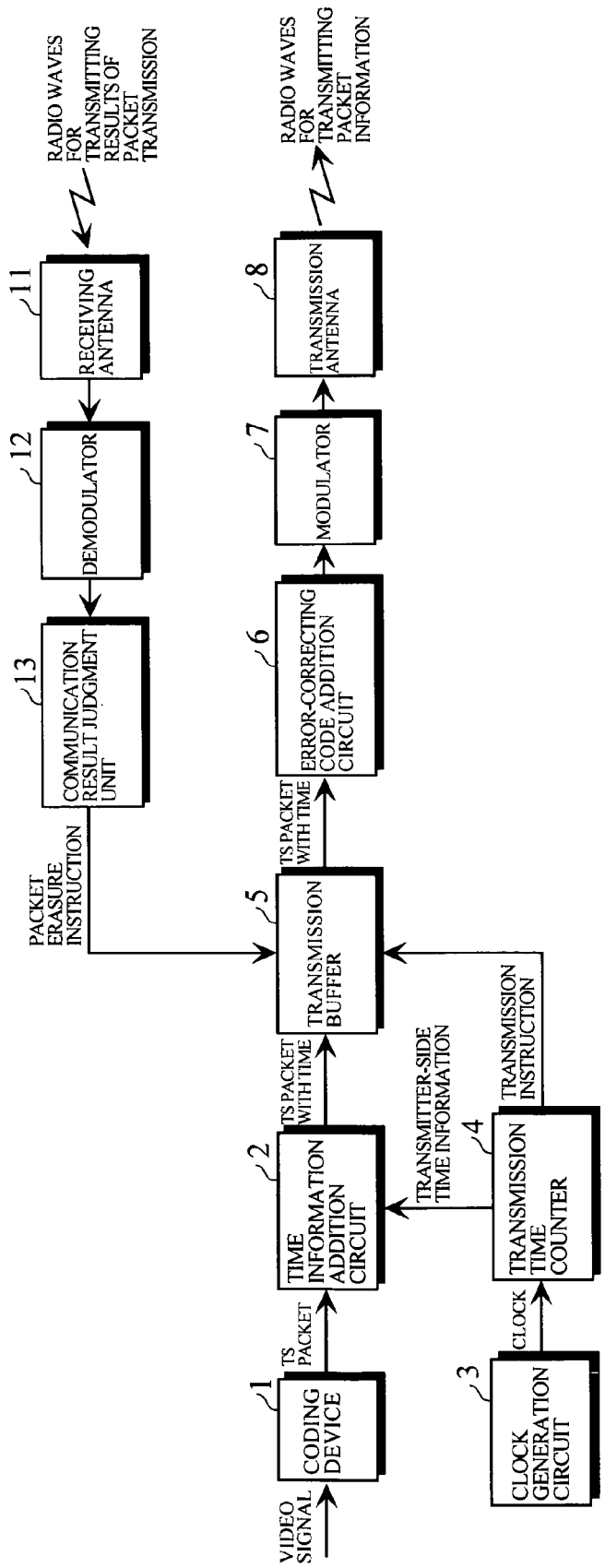
FIG. 1 is a block diagram showing the configuration of a transmitter in a radio transmission system.

Referring now to the drawings, description is now made of an embodiment of the present invention.

Figure 2:
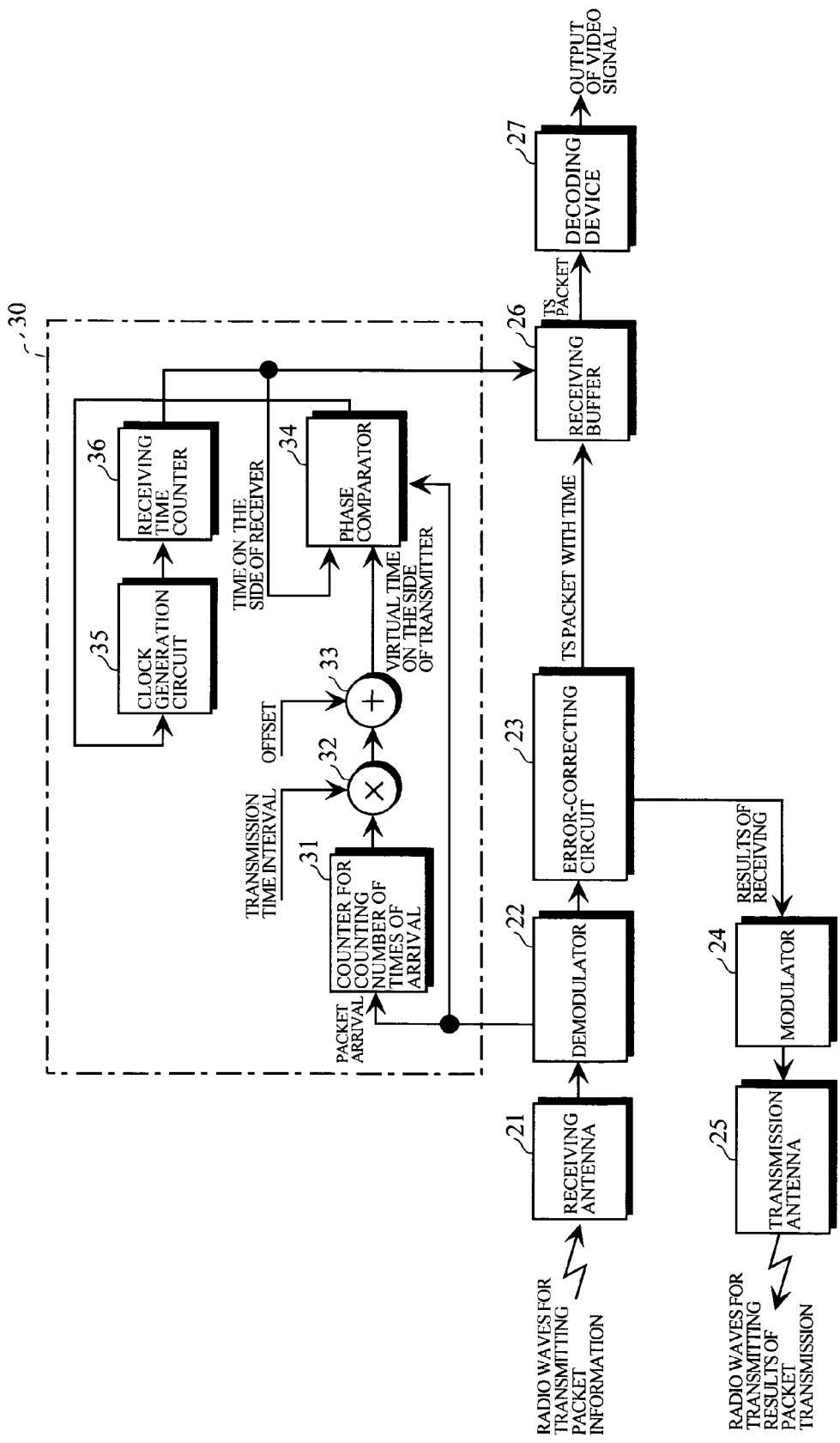
FIG. 2 is a block diagram showing the configuration of a receiver in a radio transmission system.

FIG. 1 illustrates the configuration of a transmitter in a radio transmission system. FIG. 2 illustrates the configuration of a receiver in the radio transmission system. FIG. 3 illustrates signals in respective units in each of the transmitter and the receiver.

In the present embodiment, it is assumed that an MPEG2 system is employed as a coding/decoding algorithm. In the present embodiment, it is assumed that only a video signal is transmitted.

The transmitter will be first described. The video signal is coded by a coding device 1. A TS (Transport Stream) packet outputted from the coding device 1 is sent to a time information addition circuit 2. On the other hand, a clock generated from a clock generation circuit 3 is sent to a transmission time counter 4. The transmission time counter 4 generates information related to the time on the side of the transmitter (hereinafter referred to as transmitter-side time information) on the basis of the clock generated from the clock generation circuit 3. The transmitter-side time information generated by the transmission time counter 4 is fed to the time information addition circuit 2.

The time information addition circuit 2 adds to each of the TS packets sent from the coding device 1 the transmitter-side time information representing the time on the side of the transmitter when the head of the TS packet is outputted from the coding device 1. The TS packet having the transmitter-side time information added thereto is stored in a transmission buffer 5.

The transmission time counter 4 outputs a transmission instruction to the transmission buffer 5 at predetermined time intervals (1.0 msec in this example). The transmission buffer 5 outputs the packet stored in the transmission buffer 5 every time it receives the transmission instruction from the transmission time counter 4.

An error-correcting code is added to the packet outputted from the transmission buffer 5 by an error-correcting code addition circuit 6. The packet having the error-correcting code added thereto is modulated by a modulator 7, and is then sent out of a transmission antenna 8.

The modulator 7 modulates a flag for synchronous control immediately before modulating packet information (information composed of one or a plurality of packets) outputted from the transmission buffer 5 on the basis of the transmission instruction, and transmits the modulated flag for synchronous control from the transmission antenna 8. That is, the flag for synchronous control is modulated and transmitted at the same time intervals as time intervals at which the transmission instruction is outputted.

The receiver notifies the transmitter through radio waves for transmitting the results of packet transmission whether or not the packet sent out of the transmitter is normally received by the receiver. The radio waves for transmitting the results of packet transmission are received by a receiving antenna 11. The radio waves for transmitting the results of packet transmission which have been received by the receiving antenna 11 are demodulated by a demodulator 12, and are then sent to a communication result judgment unit 13. The communication result judgment unit 13 judges whether or not the packet sent out of the transmitter is normally received on the basis of a signal fed from the demodulator 12, and outputs, when it judges that the packet is normally received, a packet erasure instruction to the transmission buffer 5.

The transmission buffer 5 erases, when it receives the packet erasure instruction, the packet which has been transmitted from the transmission buffer 5.

"Coding device packet output" shown in FIG. 3 indicates timing at which the TS packet is outputted from the coding device 1. In an example shown in FIG. 3, a packet a1 is outputted from the coding device 1 when the time on the side of the transmitter is 1.0 msec, while a packet a2 is outputted from the coding device 1 when the time on the side of the transmitter is 1.2 msec.

The packets a1 and a2 are sent out when the time on the side of the transmitter is 2.0 msec, while packets b1, b2, and b3 are sent out when the time on the side of the transmitter is 3.0 msec. In the example shown in FIG. 3, a transmission error occurs in the packets b1, b2, and b3 sent out when the time on the side of the transmitter is 3.0 msec. Therefore, the packets b1, b2, and b3 are retransmitted when the time on the side of the transmitter is 4.0 msec.

The receiver will be then described. Radio waves for transmitting packet information which are outputted from the transmitter are received by a receiving antenna 21. The radio waves for transmitting packet information which have been received by the receiving antenna 21 are sent to a demodulator 22 and are demodulated. A signal obtained by the demodulator 22 is fed to an error-correcting circuit 23 and is subjected to error correction.

The error-correcting circuit 23 sends to a modulator 24 the results of receiving indicating whether or not error correction can be normally made. The modulator 24 modulates the results of receiving, and sends out the modulated results of receiving from a transmission antenna 25 as radio waves for transmitting the results of packet transmission.

The error-correcting circuit 23 stores a TS packet with transmitter-side time information in a receiving buffer 26 when error correction can be normally made. The TS packet stored in the receiving buffer 26 is sent to a decoding device 27 and is decoded when the transmitter-side time information added thereto coincides with receiver-side time information generated from a receiver-side time generation circuit 30, described later.

The receiver-side time generation circuit 30 will be described. In the demodulator 22, a packet arrival signal is fed to a counter 31 for counting the number of times of arrival and a phase comparator 34 every time a flag for synchronous control is obtained by decoding. The counter 31 counts the packet arrival signal. A count value of the counter 31 is sent to a multiplier 32, where the count value is multiplied by a transmission time interval (1.0 msec in this example). The results of the multiplication by the multiplier 32 are sent to an adder 33, where an offset is added to the results of the multiplication, thereby generating the virtual time on the side of the transmitter.

The reason why the offset is added is that the packet cannot be outputted from the receiving buffer 26 as at the time represented by the transmitter-side time information added thereto because there is a delay in packet transmission if the time on the side of the transmitter is taken as the time on the side of the receiver as it is.

The time on the side of the receiver is generated by a PLL circuit (phase-locked loop circuit) comprising a phase comparator 34, a clock generation circuit 35, and a receiving time counter 36 on the basis of the virtual time on the side of the transmitter.

That is, the respective phases of a clock representing the virtual time on the side of the transmitter and a clock representing the time on the side of the receiver which is outputted from the receiving time counter 36 are compared with each other in the phase comparator 34. The frequency of a clock outputted from the clock generation circuit 35 is controlled on the basis of a phase difference detected by the phase comparator 34 so that the frequency of the clock representing the time on the side of the receiver is synchronized with the frequency of the clock representing the virtual time on the side of the transmitter.

The example shown in FIG. 3 illustrates a case where the offset given to the multiplier 32 is −3. The virtual time on the side of the transmitter is −2.0 msec when a flag for synchronous control corresponding to 1.0 msec which is the time on the side of the transmitter, while being increased +1.0 at a time every time the flag for synchronous control is detected after that.

Although the phase of the clock representing the virtual time on the side of the transmitter and the clock representing the time on the side of the receiver are first shifted, they are controlled such that the phase difference therebetween is zero by the PLL circuit. In the example shown in FIG. 3, the packets a1 and a2 are outputted from the receiving buffer 26 when the time on the side of the receiver is 1.0 msec, while the packets b1, b2, and b3 are outputted from the receiving buffer 26 when the time on the side of the receiver is 2.0 msec.

According to the above-mentioned embodiment, the packet can be inputted to the decoding device in the receiver at approximately the same time intervals as the time intervals of the packet generated by the coding device in the transmitter.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a radio transmission system comprising a transmitter comprising a coding device and a receiver comprising a decoding device, the transmitter transmitting a packet outputted from the coding device by radio through a transmission buffer, the receiver notifying, when it has normally received the packet, the transmitter that it has normally received the packet, and the transmitter which has been notified that the receiver has normally received the packet erasing only the packet from the transmission buffer,
   a radio transmission system wherein
   the transmitter comprises
   means for adding to the packet outputted from the coding device transmitter-side time information representing the time on the side of the transmitter when the packet is outputted from the coding device,
   means for storing in the transmission buffer the packet having the transmitter-side time information added thereto, and
   means for transmitting the packet stored in the transmission buffer at predetermined time intervals, and
   the receiver comprises
   number-of-packet-arrivals counting means for updating a count value each time the packet transmitted for each predetermined time interval from the transmitter is received,
   multiplying means for multiplying the count value of the number-of-packet arrivals counting means by a packet transmission time interval determined on the side of the transmitter,
   adding means for generating a virtual time on the side of the transmitter by adding a predetermined offset value to a result of multiplication by the multiplying means,
   means for synchronizing the time on the side of the receiver with the time on the side of the transmitter by a PLL circuit on the basis of the virtual time on the side of the transmitter obtained by the adding means,
   means for holding the received packet in a receiving buffer, and
   means for outputting, when the time on the side of the receiver coincides with the time on the side of the transmitter which is represented by the transmitter-side time information added to the packet held in the receiving buffer, the packet to the decoding device.

2. In a radio transmission system comprising a transmitter comprising a coding device and a receiver comprising a decoding device, the transmitter transmitting a packet outputted from the coding device by radio through a transmission buffer, the receiver notifying, when it has normally received the packet, the transmitter that it has normally received the packet, and the transmitter which has been notified that the receiver has normally received the packet erasing only the packet from the transmission buffer,
   a radio transmission system wherein
   the transmitter comprises
   a circuit for adding to the packet outputted from the coding device transmitter-side time information representing the time on the side of the transmitter when the packet is outputted from the coding device,
   a circuit for storing in the transmission buffer the packet having the transmitter-side time information added thereto, and
   a circuit for transmitting the packet stored in the transmission buffer at predetermined time intervals, and
   the receiver comprises
   a number-of-packet-arrivals counter for updating a count value each time the packet transmitted for each predetermined time interval from the transmitter is received,
   a multiplier for multiplying the count value of the number-of-packet-arrivals counter by a packet transmission time interval determined on the side of the transmitter,
   an adder for generating a virtual time on the side of the transmitter by adding a predetermined offset value to a result of multiplication by the multiplier,
   a circuit for synchronizing the time on the side of the receiver with the time on the side of the transmitter by a PLL circuit on the basis of the virtual time on the side of the transmitter obtained by the adder,
   a circuit for holding the received packet in a receiving buffer, and
   a circuit for outputting, when the time on the side of the receiver coincides with the time on the side of the transmitter which is represented by the transmitter-side time information added to the packet held in the receiving buffer, the packet to the decoding device.

3. In a radio transmission system comprising a transmitter comprising a coding device and a receiver comprising a decoding device, the transmitter transmitting a packet outputted from the coding device by radio through a transmission buffer, the receiver notifying, when it has normally received the packet, the transmitter that it has normally received the packet, and the transmitter which has been notified that the receiver has normally received the packet erasing only the packet from the transmission buffer,
   a radio transmission system wherein
   the transmitter comprises a time information adding circuit, a clock generation circuit and a transmission time counter in addition to the coding device and the transmission buffer,
   the time information adding circuit adding to the packet outputted from the coding device transmitter-side time information representing the time on the side of the transmitter when the packet is outputted from the coding device,
   the transmission buffer holding the packet to which the transmitter-side time information is added by the time information adding circuit, outputting the packet upon receipt of a transmission instruction, and erasing the packet which has been transmitted upon receipt of a packet erasure instruction,
   the clock generation circuit generating a clock, and
   the transmission time counter generating the transmitter-side time information based on the clock generated from the clock generation circuit to provide the transmitter-side time information for the time information adding circuit, and outputting the transmission instruction to the transmission buffer at predetermined time intervals,
   the receiver comprises
   means for synchronizing the time on the side of the receiver with the time on the side of the transmitter by a PLL circuit on the basis of receiving intervals of the packet transmitted for each predetermined time interval from the transmitter;

means for holding the received packet in a receiving buffer, and means for outputting, when the time on the side of the receiver coincides with the time on the side of the transmitter which is represented by the transmitter-side time information added to the packet held in the receiving buffer, the packet to the decoding device.

4. In a radio transmission system comprising a transmitter comprising a coding device and a receiver comprising a decoding device, the transmitter transmitting a packet outputted from the coding device by radio through a transmission buffer, the receiver notifying, when it has normally received the packet, the transmitter that it has normally received the packet, and the transmitter which has been notified that the receiver has normally received the packet erasing only the packet from the transmission buffer, a radio transmission system wherein the transmitter comprises a time information adding circuit, a clock generation circuit and a transmission time counter in addition to the coding device and the transmission buffer, the time information adding circuit adding to the packet outputted from the coding device transmitter-side time information representing the time on the side of the transmitter when the packet is outputted from the coding device, the transmission buffer holding the packet to which the transmitter-side time information is added by the time information adding circuit, outputting the packet upon receipt of a transmission instruction, and erasing the packet which has been transmitted upon receipt of a packet erasure instruction, the clock generation circuit generating a clock, and the transmission time counter generating the transmitter-side time information based on the clock generated from the clock generation circuit to provide the transmitter-side time information for the time information adding circuit, and outputting the transmission instruction to the transmission buffer at predetermined time intervals, the receiver comprises a circuit for synchronizing the time on the side of the receiver with the time on the side of the transmitter by a PLL circuit on the basis of receiving intervals of the packet transmitted for each predetermined time interval from the transmitter;

a circuit for holding the received packet in a receiving buffer, and a circuit for outputting, when the time on the side of the receiver coincides with the time on the side of the transmitter which is represented by the transmitter-side time information added to the packet held in the receiving buffer, the packet to the decoding device.

* * * * *